United States Patent
Hoshino

(10) Patent No.: US 8,243,673 B2
(45) Date of Patent: Aug. 14, 2012

(54) RADIO COMMUNICATION APPARATUS, RADIO COMMUNICATION SYSTEM, AND RADIO COMMUNICATION METHOD

(75) Inventor: Masayuki Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 12/664,595

(22) PCT Filed: May 1, 2008

(86) PCT No.: PCT/JP2008/001132
§ 371 (c)(1),
(2), (4) Date: Dec. 14, 2009

(87) PCT Pub. No.: WO2008/152766
PCT Pub. Date: Dec. 18, 2008

(65) Prior Publication Data
US 2010/0183056 A1 Jul. 22, 2010

(30) Foreign Application Priority Data
Jun. 15, 2007 (JP) .................................. 2007-159406

(51) Int. Cl.
*H04B 7/00* (2006.01)
(52) U.S. Cl. ......... 370/329; 370/335; 370/342; 714/746
(58) Field of Classification Search ........................ None
See application file for complete search history.

(56) References Cited

U.S. PATENT DOCUMENTS

| | | | |
|---|---|---|---|
| 2008/0186934 A1* | 8/2008 | Khan et al. | 370/342 |
| 2009/0010211 A1* | 1/2009 | Sumasu et al. | 370/329 |
| 2009/0013232 A1* | 1/2009 | Wan et al. | 714/748 |
| 2010/0027697 A1* | 2/2010 | Malladi et al. | 375/260 |
| 2012/0082112 A1* | 4/2012 | Lee et al. | 370/329 |

FOREIGN PATENT DOCUMENTS

| | | |
|---|---|---|
| JP | 2007-251924 A | 9/2007 |
| WO | 2007-094353 A1 | 8/2007 |

OTHER PUBLICATIONS

International Search Report for PCT/JP2008/001132.
"MIMO Proposal for MIMO-WCDMA Evaluation", (Document for Discussion); 3GPP TSG-RAN WG1 #42, Qualcomm Europe, London, UK, Aug. 29-Sep. 2, 2005, pp. 1-21.
Panasonic Discussion of MIMO Codeword, R1-062177; 3GPP TSG RAN WG1 Meeting #46, Tallinn, Estonia, Aug. 28-Sep. 1, 2006; pp. 1-3.
Siemens HS-SCCH RV Signalling for MIMO, R1-070830; 3GPP TSG RAN WG1 Meeting #48, St. Louis, USA Feb. 12-16, 2007; pp. 1-9.

* cited by examiner

*Primary Examiner* — Robert Scheibel
(74) *Attorney, Agent, or Firm* — Pearne & Gordon LLP

(57) ABSTRACT

Overhead of signaling for retransmission control using a multiple codeword is decreased and throughput is improved. A radio communication apparatus performs data transmission by using the multiple codeword, and includes a reception device having a MIMO demodulation section 15 for demodulating data transmitted by the multiple codeword and an ACK/NACK generation section 21 for generating an ACK/NACK signal corresponding to the demodulation result of the demodulated data of respective codewords. The ACK/NACK generation section 21 allocates less resource to a signal corresponding to a low-order code word having a lower quality, and allocates more resource to a signal for a high-order codeword having a higher quality, thereby generating the ACK/NACK signal.

17 Claims, 10 Drawing Sheets

CORRESPONDING ACK/NACK FORMAT

FIG. 6 (A)

| CODEWORD NUMBER | ERROR DETECTION RESULT | TRANSMISSION PARAMETER | RANK ORDER | NUMBER OF RESOURCES | ACK/NACK GENERATION SECTION OUTPUT |
|---|---|---|---|---|---|
| 1 | 1 | CQI3 | 4 | 1 | 1 |
| 2 | 0 | CQI8 | 3 | 2 | 00 |
| 3 | 0 | CQI19 | 1 | 8 | 00000000 |
| 4 | 1 | CQI10 | 2 | 4 | 1111 |

FIG. 6 (B)

| CODEWORD NUMBER | ERROR DETECTION RESULT | TRANSMISSION PARAMETER | RANK ORDER | POWER CONTROL VALUE | ACK/NACK GENERATION SECTION OUTPUT |
|---|---|---|---|---|---|
| 1 | 1 | CQI3 | 4 | -9dB | 1 |
| 2 | 0 | CQI8 | 3 | -6dB | 0 |
| 3 | 0 | CQI19 | 1 | 0dB | 0 |
| 4 | 1 | CQI10 | 2 | -3dB | 1 |

FIG. 10

| CODEWORD NUMBER | TRANSMISSION PARAMETER | RANK ORDER | TOTAL NUMBER OF RV BITS | NDI NUMBER OF BITS | CONTENT OF RV | |
|---|---|---|---|---|---|---|
| | | | | | PARITY NUMBER OF BITS | CONST NUMBER OF BITS |
| 1 | CQI3 | 4 | 1 | 1 | 0 | 0 |
| 2 | CQI8 | 3 | 1 | 1 | 0 | 0 |
| 3 | CQI19 | 1 | 5 | 1 | 2 | 2 |
| 4 | CQI10 | 2 | 3 | 1 | 1 | 1 |

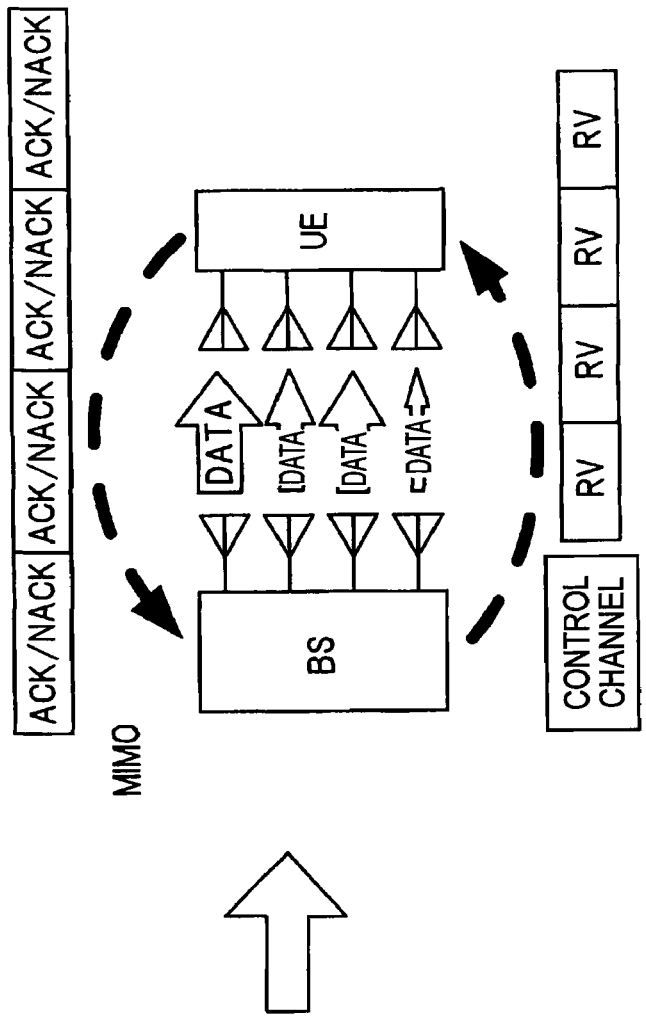
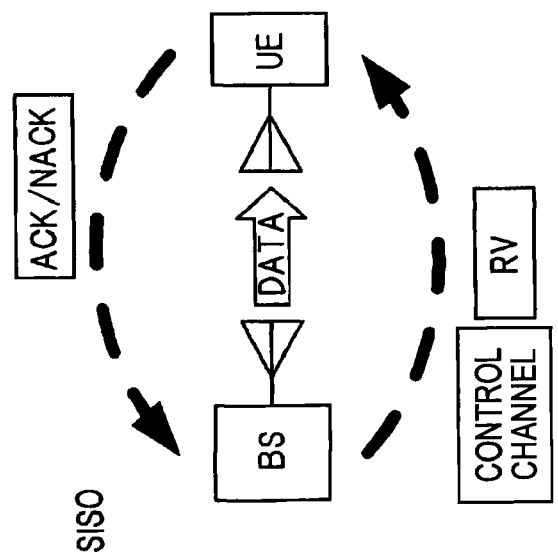
FIG. 11 (B)
FIG. 11 (A)

RADIO COMMUNICATION APPARATUS, RADIO COMMUNICATION SYSTEM, AND RADIO COMMUNICATION METHOD

TECHNICAL FIELD

This invention relates to a radio communication apparatus, a radio communication system, and a radio communication method that can be applied to MIMO (Multiple-Input Multiple-Output), etc., for conducting communications using multiple antennas.

BACKGROUND ART

In recent years, attention has been focused on MIMO (Multiple-Input Multiple-Output) as a system effectively using a limited frequency band in a radio communication art for realizing high-speed transmission. The MIMO is an art of transmitting data using multiple antennas in both transmission and reception. Different data is transmitted from multiple transmission antennas, whereby the transmission capacity can be enhanced without enlarging the time and frequency resources.

Applying a multiple codeword (MCW: Multiple codeword) to a data transmission method in the MIMO is effective. The multiple codeword makes it possible to give CRC (Cyclic Redundancy Check) to each data piece of each transmission path formed by multiple transmission antennas and beams and then give an error correction code of convolutional code, Turbo code, LDPC code, etc., and set a modulation system and a coding ratio responsive to SINR (Signal-to-Interference plus Noise power Ratio) corresponding to the transmission path (transmission antenna and beam). In addition to the ability to set such a flexible modulation system and a coding ratio, in the multiple codeword, it is possible to make an error correction based on CRC for each transmission path, so that units of retransmission control can be set to transmission path units (transmission antenna and beam units) and a gain can be obtained efficiently according to the retransmission control.

FIG. 11 is a drawing to schematically show an increase in overhead in HARQ control using a multiple codeword. Here, the case where a signal is transmitted from a wireless base station (BS: Base Station) which becomes a transmission apparatus (transmission station) to a user terminal (UE: User Equipment) of a mobile station which becomes a reception apparatus (reception station) in a cellular system for mobile communications of a mobile telephone, etc., is shown as an example. FIG. 11(A) shows an example of a control signal transmitted in SISO (Single-Input Single-Output) and FIG. 11(B) shows an example of a control signal transmitted in MIMO.

To perform retransmission control based on hybrid-ARQ (Hybrid-Automatic Repeat reQuest) (hereinafter, described as HARQ), in the SISO system, one codeword is used and a pilot signal in a control channel (control CH) and a control signal containing one RV code are transmitted from the transmission apparatus to the reception apparatus. As a response signal, ACK (Acknowledgement) when the reception signals can be normally acquired or NACK (Negative Acknowledgement) when an error is contained in the reception signals is transmitted from the reception apparatus to the transmission apparatus. In contrast, in the MIMO system, to perform HARQ control using a multiple codeword, a pilot signal in a control channel (control CH) and a control signal containing a plurality of RV(redundancy version) parameters provided for each codeword (for each transmission path) are transmitted from the transmission apparatus to the reception apparatus. As a response signal, ACK or NACK for each codeword (for each transmission path) is transmitted from the reception apparatus to the transmission apparatus.

In the HARQ control using the multiple codeword as described above, information of the HARQ control becomes necessary for each codeword. Thus, if the number of codewords become N times, ACK/NACK feedback in the up direction from the reception apparatus to the transmission apparatus required for the HARQ control and signaling of each RV parameter in the down direction from the transmission apparatus to the reception apparatus become each N times. Thus, it becomes necessary to allocate more resource to signaling for transmitting a control signal and a response signal, thus resulting in a decrease in throughput.

Non-patent document 1: 3GPP TSG RAN WG1 #42, R1-050912, Qualcomm Europe, "MIMO proposal for MIMO-WCDMA evaluation", Aug. 29-Sep. 2, 2005

DISCLOSURE OF THE INVENTION

Problems to be Solved by the Invention

As described above, to perform the retransmission control based on the HARQ control using the multiple codeword, etc., control information is required for each codeword (namely, for each transmission path formed by a plurality of transmission antennas and beams) and thus there is a problem in that more resource become necessary for signaling for transmitting control information of a control signal containing RV parameters, a response signal of ACK/NACK, and the like and overhead occurs at the transmitting time, resulting in a decrease in throughput.

In view of the circumstances described above, it is an object of the invention to provide a radio communication apparatus, a radio communication system, and a radio communication method that can decrease the overhead of signaling for retransmission control using a multiple codeword and make it possible to enhance throughput.

Means For Solving the Problems

First, the invention provides radio communication apparatus for performing data transmission using a multiple codeword, the radio communication apparatus comprising: a retransmission control section that performs retransmission control of data transmitted with the multiple codeword; and a resource distribution section that distributes resources of control information concerning the retransmission control based on the quality rank order of respective codewords in the multiple codeword, wherein the resource distribution section allocates less resource to a codeword having a lower quality. Accordingly, it is made possible to decrease the overhead of signaling for retransmission control using the multiple codeword.

Second, the invention contains the radio communication apparatus described above further including a demodulation section that demodulates the data transmitted with the multiple codeword; and a response signal generation section that generates a response signal corresponding to a demodulation result of demodulated data of the respective codewords as the control information concerning the retransmission control, wherein the resource distribution section allocates less resource to the response signal for a low-order codeword having a lower quality.

Accordingly, when retransmission control using the multiple codeword is performed, resource allocation of the control information concerning the response signal from the reception station to the transmission station can be adjusted and it is made possible to decrease the overhead of signaling for retransmission control.

Third, the invention contains the radio communication apparatus described above further including a transmission section that transmits data with the multiple codeword; and a control signal setting section that sets a control signal containing retransmission control parameters corresponding to the respective transmitted codewords as the control information concerning the retransmission control, wherein the resource distribution section allocates less resource to the control signal for a low-order codeword having a lower quality.

Accordingly, when retransmission control using the multiple codeword is performed, resource allocation of the control information concerning the control signal from the transmission station to the reception station can be adjusted and it is made possible to decrease the overhead of signaling for retransmission control.

Fourthly, the invention provides radio communication apparatus for performing data transmission using a multiple codeword, the radio communication apparatus comprising: a demodulation section that demodulates the data transmitted with the multiple codeword; and a response signal generation section that generates a response signal corresponding to a demodulation result of the demodulated data of respective codewords, wherein the response signal generation section allocates less resource to a low-order codeword having a lower quality.

Accordingly, when retransmission control using the multiple codeword is performed, resource allocation of the control information concerning the response signal from the reception station to the transmission station can be adjusted and it is made possible to decrease the overhead of signaling for retransmission control.

Fifthly, the invention contains the radio communication apparatus described above wherein the response signal generation section generates an ACK/NACK signal as the response signal, and allocates resources to the respective codewords, the resources containing at least one of the number of symbols, the number of subcarriers, the number of bits, and a power control value; and wherein the ACK/NACK signal indicates whether data for the respective code words can be normally demodulated or not.

Sixthly, the invention contains the radio communication apparatus described above wherein the response signal generation section generates the response signal so as to allocate more resource to a high-order codeword having a higher quality and allocate less resource to a low-order codeword having a lower quality.

Seventhly, the invention provides a radio communication apparatus for performing data transmission using a multiple codeword, the radio communication apparatus comprising: a transmission section that transmits data with the multiple codeword; and a response signal demodulation section that demodulates a response signal fed back from a remote station to which the data is transmitted, wherein the response signal demodulation section demodulates the response signal based on the quality rank order of the transmitted codewords and resource amounts allocated to the codewords.

Accordingly, it is made possible to appropriately demodulate the response signal corresponding to each codeword based on the quality rank order of the codeword and the resource amounts allocated to the respective codewords.

Eighthly, the invention provides a radio communication apparatus for performing data transmission using a multiple codeword, the radio communication apparatus comprising: a transmission section that transmits data with the multiple codeword; and a control signal setting section that sets a control signal containing retransmission control parameters corresponding to respective codewords to be transmitted, wherein the control signal setting section sets the control signal so as to allocate less resource to the control signal for a low-order codeword having a lower quality.

Accordingly, when retransmission control using the multiple codeword is performed, resource allocation of the control information concerning the control signal from the transmission station to the reception station can be adjusted and it is made possible to decrease the overhead of signaling for retransmission control.

Ninthly, the invention contains the radio communication apparatus described above wherein the control signal setting section sets a control signal containing RV parameters as the retransmission control parameters and allocates resources to the respective codewords, the resources containing at least one of a content and the number of bits of the RV parameter.

Tenthly, the invention contains the radio communication apparatus described above wherein the control signal setting section sets the control signal in accordance with the quality rank order so as to allocate more resource to the RV parameter corresponding to a high-order codeword having a higher quality and reduces at least one of the content and the number of bits of the RV parameter corresponding to a low-order codeword having a lower quality more than others.

Eleventhly, the invention provides radio communication apparatus for performing data transmission using a multiple codeword, the radio communication apparatus comprising: a demodulation section that demodulates the data transmitted with the multiple codeword; and a synthesizing section that synthesizes a retransmission packet when the data is retransmitted, wherein the synthesizing section synthesizes the retransmission packet based on a content of the control signal set according to the quality rank order of respective codewords and transmitted from a remote station.

Accordingly, it is made possible to receive the instruction of retransmission control corresponding to respective code words and appropriately execute processing of a retransmission signal based on the quality rank order of the codewords and the description of the control signal allocated to the respective codewords.

Twelfthly, the invention provides a radio communication base station apparatus equipped with any one of the radio communication apparatuses described above.

Thirteenthly, the invention provides a radio communication mobile station apparatus equipped with any one of the radio communication apparatuses described above.

Fourteenthly, the invention provides a radio communication system for performing data transmission using a multiple codeword, the radio communication system comprising: a reception apparatus including: a demodulation section that demodulates data transmitted from a transmission apparatus with the multiple codeword; and a response signal generation section that, when generating a response signal corresponding to a demodulation result of the demodulated data of respective codewords, generates the response signal so as to allocate less resource to a low-order codeword having a lower quality, and the transmission apparatus including: a transmission section that transmit the data to the reception apparatus with the multiple codeword; and a response signal demodulation section that, when demodulating the response signal fed back from the reception apparatus to which the data is transmitted, demodulates the response signal based on the quality rank order of the transmitted codewords and resource amounts allocated to the respective codewords.

Fifteenthly, the invention provides radio communication system for performing data transmission using a multiple codeword, the radio communication system comprising: a transmission apparatus including: a transmission section that transmits data to a reception apparatus with the multiple codeword; and a control signal setting section that, when setting a control signal containing retransmission control parameters corresponding to the transmitted respective codewords, set the control signal so as to allocate less resource to the control signal for a low-order codeword having a lower quality, and the reception apparatus including: a demodulation section that demodulates the data transmitted from the transmission apparatus with the multiple codeword; and a synthesizing section that, when synthesizing a retransmission packet when the data is retransmitted, synthesizes the retransmission packet based on a content of the control signal set according to the quality rank order of the respective codewords and transmitted from the transmission apparatus.

Sixteenthly, the invention provides a radio communication method for performing data transmission using a multiple codeword, the radio communication method comprising: in a reception apparatus, a demodulation step of demodulating data transmitted from a transmission apparatus with the multiple codeword; and a response signal generation step, when generating a response signal corresponding to a demodulation result of the demodulated data of respective codewords, the step of generating the response signal so as to allocate less resource to a low-order codeword having a lower quality, and in the transmission apparatus, a transmission step of transmitting the data to the reception apparatus with the multiple codeword; and a response signal demodulation step, when demodulating the response signal fed back from the reception apparatus to which the data is transmitted, the step of demodulating the response signal based on the quality rank order of the transmitted codewords and resource amounts allocated to the respective codewords.

Seventeenthly, the invention provides a radio communication method for performing data transmission using a multiple codeword, the radio communication method comprising: in a transmission apparatus, a transmission step of transmitting data to a reception apparatus with the multiple codeword; and a control signal setting step, when setting a control signal containing retransmission control parameters corresponding to the transmitted respective codewords, the step of setting the control signal so as to allocate less resource to the control signal for a low-order codeword having a lower quality rank order and, and in a reception apparatus, a demodulation step of demodulating the data transmitted from the transmission apparatus with the multiple codeword; and a synthesizing step, when synthesizing a retransmission packet when the data is retransmitted, the step of synthesizing the retransmission packet based on a content of the control signal set according to the quality rank order of the respective codewords and transmitted from the transmission apparatus.

Advantages of the Invention

According to the invention, there can be provided a radio communication apparatus, a radio communication system, and a radio communication method that can decrease the overhead of signaling for retransmission control using a multiple codeword and make it possible to enhance throughput.

BRIEF DESCRIPTION OF THE DRAWINGS

FIG. 6 is a drawing to show specific examples of resource allocation of ACK/NACK signal for each codeword responsive to the rank order of transmission parameters in the first embodiment.

FIG. 10 is a drawing to show specific examples of resource allocation of the RV parameters for each codeword responsive to the rank order of transmission parameters in the second embodiment.

FIG. 11 is a drawing to schematically show an increase in overhead in HARQ control using a multiple codeword.

Figure 1:
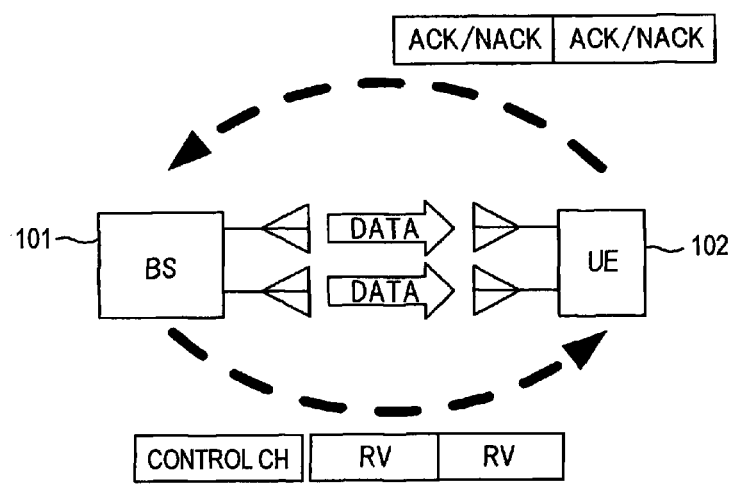
FIG. 1 is a drawing to schematically show an example of a control signal transmitted in HARQ control using a multiple codeword.

DESCRIPTION OF REFERENCE NUMERALS 11a, 11b Antenna
12a, 12b Reception RF section
13 Channel estimation section
14, 64 Control signal demodulation section
15 MIMO demodulation section
16 Decoding section
17 Likelihood retention section
18 CRC inspection section
19 SINR measuring section
20 Feedback information generation section
21 ACK/NACK generation section
22 Coding section
23 Multiplexing section
24 Transmission RF section
31 Coding section
32 Rate matching section
33, 53 Retransmission signal control section
34, 54 Control signal generation section
35 MIMO multiplexing section
36a, 36b Transmission RF section
37a, 37b Antenna
38 Reception RF section
39 Separating section
40 Demodulation and decoding section
41 CRC inspection section
42 ACK/NACK demodulation section
101 Wireless base station
102 User terminal

BEST MODE FOR CARRYING OUT THE INVENTION

In embodiments, configuration examples for a transmission apparatus and a reception apparatus to perform signal transmission through multiple antennas and perform retransmission control (adaptive retransmission control) based on HARQ control using a multiple codeword in a radio communication system adopting MIMO (Multiple-Input Multiple-Output antenna) are shown as examples of a radio communication apparatus, a radio communication system, and a retransmission control method according to the invention. The following embodiments are examples for description and the invention is not limited to them.

FIG. 1 is a drawing to schematically show an example of a control signal transmitted in HARQ control using a multiple codeword. Here, the case where a signal is transmitted according to the MIMO system from a wireless base station (BS: Base Station) 101 which serves as a transmission apparatus (transmission station) to a user terminal (UE: User Equipment) 102 of a mobile station which serves as a reception apparatus (reception station) in a cellular system for mobile communications of a mobile telephone, etc., is shown as an example. The example in FIG. 1 is an example of performing retransmission control for transmitting a signal for each antenna in a multiple antenna and using a multiple codeword providing a codeword to the each antenna.

To perform retransmission control based on HARQ control using a multiple codeword, a pilot signal in a control channel (control CH) and a control signal containing a plurality of RV parameters provided for each codeword (here, for each antenna) are transmitted from the transmission apparatus to the reception apparatus. As a response signal, ACK when the reception signals can be normally acquired or NACK when an error is contained in the reception signals is transmitted for each codeword from the reception apparatus to the transmission apparatus. In the control channel, information concerning a modulation system and a coding ratio is sent to the reception apparatus. In the RV parameters, information containing the number of transmission times indicating the how many times of the transmission, the parity start position, etc., is sent to the reception apparatus. Here, retransmission control using IR (Incremental Redundancy) synthesis is assumed.

The modulation system and the coding ratio are controlled in units of transmission paths formed by a plurality of transmission antennas and beams according to HARQ control using a multiple codeword, whereby each channel (transmission path) of MIMO can be used effectively. Since HARQ can be controlled adaptively in codeword units (transmission path units), there is an advantage that retransmission efficiency is good.

To perform such HARQ control using a multiple codeword, in the embodiments, in signaling of a control signal and a response signal to transfer control information concerning retransmission control, resource distribution is adjusted and is made efficient for decreasing overhead.

In retransmission control of a multiple codeword, as the contribution degree of throughput concerning data transmission, a high-order codeword having a higher quality is dominant. That is, a signal with good quality of SINR, etc., having a high coding ratio, and adopting a multi-value demodulation system acts largely on the throughput. Information of the codeword rank order (quality rank order) is shared between the transmission apparatus and the reception apparatus using a control channel. In the embodiments, attention is focused on this point; in signaling of a control signal and a response signal, more resource are allocated to a signal corresponding to a high-order codeword having a higher quality and small resources are allocated to a signal corresponding to a low-order codeword having a lower quality, whereby resource distribution among codewords of a multiple codeword is well modulated and control information corresponding to a high-order codeword is transmitted with high specifications and resources for control information corresponding to a low-order codeword are reduced. Accordingly, while overhead concerning retransmission control is decreased, the throughput of data transmission is enhanced. The advantage provided by the resource distribution becomes larger as the number of transmission paths of the number of antennas, the number of beams, etc, increases.

(First Embodiment)

Resource distribution of an ACK/NACK signal will be described as resource distribution of signaling concerning retransmission control in a first embodiment of the invention. In the first embodiment, small resources are allocated to an ACK/NACK signal corresponding to a low-order codeword having a lower quality in the ACK/NACK signal for each codeword fed back into a transmission apparatus from a reception apparatus.

At this time, the reception apparatus demodulates data transmitted with a multiple codeword and when generating a feedback signal containing an ACK/NACK signal corresponding to the demodulation result of each codeword, the reception apparatus generates the ACK/NACK signal with less resource as the codeword is a lower-order codeword having a lower quality. The transmission apparatus transmits data with a multiple codeword to the reception apparatus and when demodulating the feedback signal from the reception apparatus, the transmission apparatus detects the ACK/NACK signal corresponding to each codeword based on the quality rank order of the transmitted codeword and the number of resources corresponding thereto.

Figure 2:
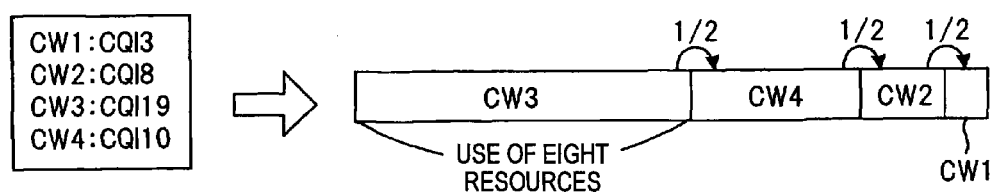
FIG. 2 is a drawing to show an example of the format of an ACK/NACK signal corresponding to a multiple codeword in a first embodiment of the invention.

FIG. 2 is a drawing to show an example of the format of an ACK/NACK signal corresponding to a multiple codeword in the first embodiment. It shows an example wherein data is transmitted in four MIMO channels (transmission paths) and four codewords are used for each transmission path for retransmission control. It is assumed that the quality of a transmission signal corresponding to each codeword corresponds to SINR at the receiving time, and the quality is indicated with a CQI (Channel Quality Indicator) value representing the reception quality relevant to any desired signal.

In the example in FIG. 2, CQI of codeword CW1 is 3, CQI of codeword CW2 is 8, CQI of codeword CW3 is 19, and CQI of codeword CW4 is 10. The larger the CQI value, the higher-order codeword having a higher quality. Therefore, the quality rank order becomes the order of codewords CW3, CW4, CW2, and CW1 from the higher order to the lower order. In this case, eight resources are allocated to ACK/NACK corresponding to the highest-order codeword CW3, four resources of a half of eight are allocated to ACK/NACK corresponding to the codeword CW4 next to the codeword CW3, two resources of a half of four are allocated to ACK/NACK corresponding to the codeword CW2 next to the codeword CW4, and one resource of a half of two is allocated to ACK/NACK corresponding to the lowest-order codeword CW1. The placement order of the ACK/NACK signals of the codewords is made the same as the quality rank order in FIG. 2, but may be set as required.

Accordingly, the resources for feedback used for a codeword with a small effect if ACK/NACK is erroneous can be lessened, so that the overhead of signaling in the HARQ control using a multiple codeword can be lessened.

Next, the configurations of specific examples of a reception apparatus and a transmission apparatus of a radio communication system according to the first embodiment will be described.

Figure 3:
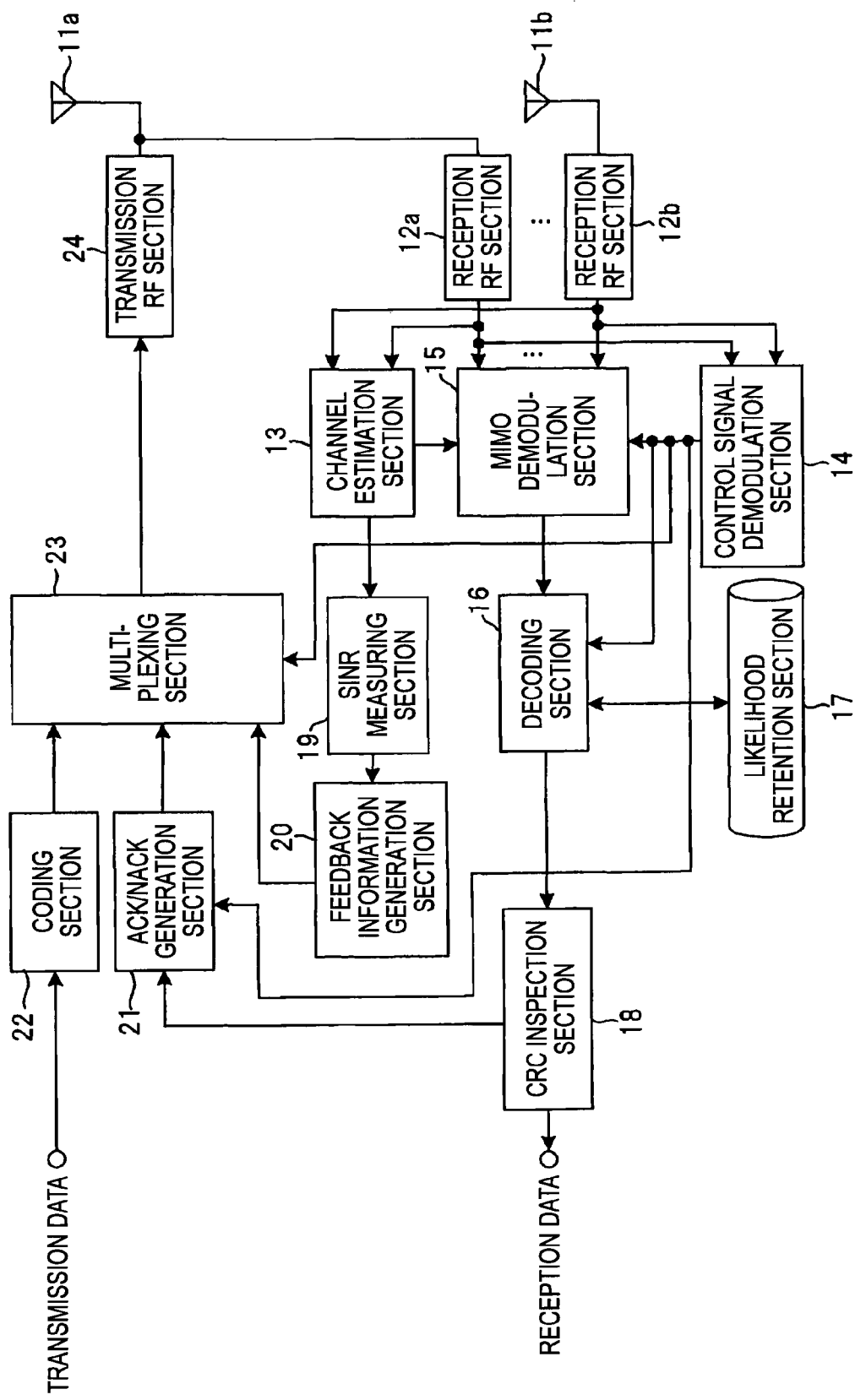
FIG. 3 is a block diagram to show the configuration of the main part of a reception apparatus (reception station) used in a first embodiment of the invention.
Figure 4:
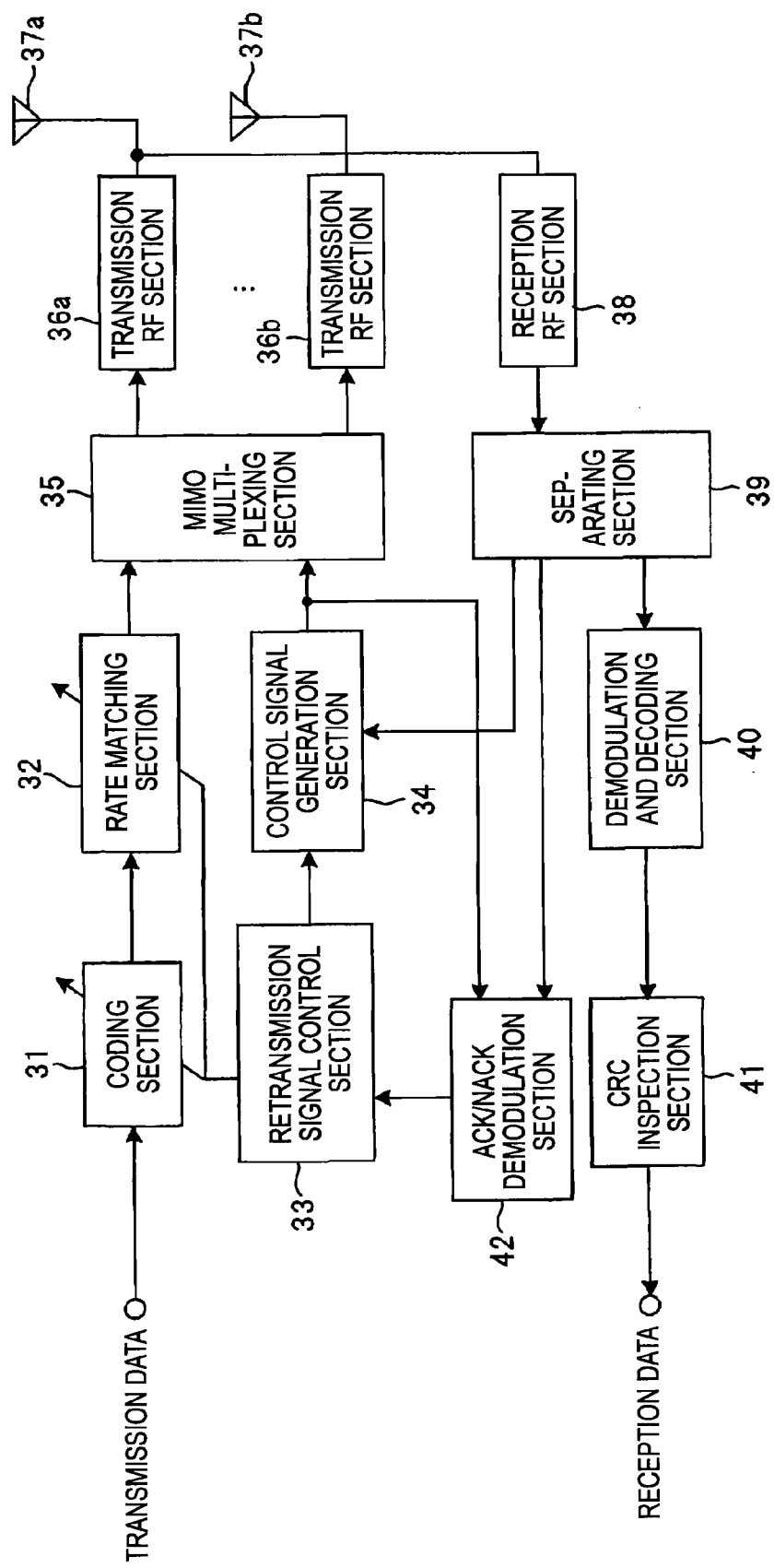
FIG. 4 is a block diagram to show the configuration of the main part of a transmission apparatus (transmission station) used in the first embodiment of the invention.

FIG. 3 is a block diagram to show the configuration of the main part of a reception apparatus (reception station) in the first embodiment of the invention, and FIG. 4 is a block diagram to show the configuration of the main part of a transmission apparatus (transmission station) in the first embodiment of the invention.

The embodiment assumes the case where radio communications are conducted using a radio wave between the reception station shown in FIG. 3 and the transmission station shown in FIG. 4. For example, it is assumed that the transmission station (transmission apparatus) shown in FIG. 4 is applied to a radio communication base station apparatus (wireless base station, BS) of a cellular system for providing communication service of mobile communications of mobile telephones, etc., and the reception station (reception apparatus) shown in FIG. 3 is applied to a user terminal (UE) of a radio communication mobile station apparatus of a mobile telephone apparatus, etc. The description is predicated on configuring of a MIMO system for performing wireless transmission and reception using multiple antennas in both transmission and reception. For example, the case where communications are conducted according to a multicarrier communication system using an OFDM (Orthogonal Frequency Division Multiplexing) signal and sequential transmission is executed in packet units, etc., is assumed as the mode of a communication signal.

The reception station shown in FIG. 3 includes a plurality of antennas 11a and 11b, a plurality of reception RF sections 12a and 12b, a channel estimation section 13, a control signal demodulation section 14, a MIMO demodulation section 15, a decoding section 16, a likelihood retention section 17, a CRC inspection section 18, an SINR measuring section 19, a feedback information generation section 20, an ACK/NACK generation section 21, a coding section 22, a multiplexing section 23, and a transmission RF section 24.

A radio wave transmitted from a remote station (for example, the transmission station shown in FIG. 4) is received by the independent antennas 11a and 11b. The radio-frequency signal of the radio wave received at the antenna 11a is converted into a signal of a comparatively low frequency band such as a baseband signal in the reception RF section 12a and then the signal is subjected to processing of Fourier transform, parallel/serial conversion, etc., and is converted into a reception signal of serial data. Likewise, the radio-frequency signal of the radio wave received at the antenna 11b is converted into a signal of a comparatively low frequency band such as a baseband signal in the reception RF section 12b and then the signal is subjected to processing of Fourier transform, parallel/serial conversion, etc., and is converted into a reception signal of serial data. The outputs of the reception RF sections 12a and 12b are input to the channel estimation section 13, the control signal demodulation section 14, and the MIMO demodulation section 15.

The channel estimation section 13 executes channel estimation based on a pilot signal contained in the signal transmitted from each transmission antenna of the remote station (transmission station) and calculates a channel estimation value. The calculated channel estimation value is input to the MIMO demodulation section 15 and the SINR measuring section 19. The control signal demodulation section 14 demodulates a control signal transmitted together with the pilot signal and extracts transmission parameters indicating the modulation system, the coding ratio, the CQI value, etc., of the transmission signal, and the like. The demodulated control signal is input to the MIMO demodulation section 15, the decoding section 16, the ACK/NACK generation section 21, and the multiplexing section 23.

The MIMO demodulation section 15 uses the channel estimation value received from the channel estimation section 13 to perform demodulation processing of the reception signal corresponding to the local station. It performs deinterleave processing, rate dematching processing so that the number of modulation multiple values and the coding ratio match those of the transmitting party, and the like. The decoding section 16 performs decoding processing of the reception signal input from the MIMO demodulation section 15 and restores the received data. At this time, likelihood combining processing of combining likelihood information of the past reception signal retained in the likelihood retention section 17 and likelihood information of the current reception signal, etc., is performed. The CRC inspection section 18 executes CRC (Cyclic Redundancy Check) inspection about the data output from the decoding section 16 and checks whether or not a data error occurs. At this time, the CRC inspection section 18 outputs the error detection result of each codeword for each antenna to the ACK/NACK generation section 21. The data is output as reception data from the CRC inspection section 18.

The SINR measuring section 19 detects the reception state of the pilot signal and calculates SINR of each codeword for each antenna. The calculated SINR of each codeword is input to the feedback information generation section 20. The feedback information generation section 20 generates feedback information containing information of the SINR of each codeword and outputs the feedback information to the multiplexing section 23. The SINR of each codeword corresponds to the CQI value of information representing the reception quality relevant to any desired signal.

The ACK/NACK generation section 21 generates an ACK/NACK signal based on the error detection result of each codeword from the CRC inspection section 18 and the quality rank order of each codeword from the control signal demodulation section 14, and outputs the ACK/NACK signal to the multiplexing section 23. Here, if the decoding result is OK and reception ends in success, ACK (Acknowledgement) is output as a response signal; if the decoding result is NG and reception ends in failure, NACK (Negative Acknowledgement) is output as a response signal. At this time, less resource are allocated to a lower-order codeword having a lower quality.

The coding section 22 performs coding processing of the transmission data and outputs the data to the multiplexing section 23. The multiplexing section 23 performs multiplex processing of the input feedback information, the ACK/NACK signal, the transmission signal containing the coded transmission data, etc. It performs rate matching processing of adaptively setting the number of modulation multiple values and the coding ratio, interleave processing, modulation processing, etc., and outputs the result to the transmission RF section 24. The transmission RF section 24 performs processing of serial/parallel conversion, inverse Fourier transform, etc., and then converts the signal into a radio-frequency signal of a predetermined radio frequency band and performs power amplification and then transmits the signal as a radio wave from the antenna 11a. At this time, the signal containing the SINR of each codeword and the response signal of the ACK/NACK signal, etc., transmitted from the reception station is transmitted to the transmission station as a feedback signal.

In the configuration described above, the control signal demodulation section 14 and the ACK/NACK generation section 21 implement the function of a retransmission control section. The ACK/NACK generation section 21 implements the function of a response signal generation section and the function of a resource distribution section. The MIMO demodulation section 15 implements the function of a demodulation section.

On the other hand, the transmission station shown in FIG. 4 includes a coding section 31, a rate matching section 32, a retransmission signal control section 33, a control signal generation section 34, a MIMO multiplexing section 35, a plurality of transmission RF sections 36a and 36b, a plurality of antennas 37a and 37b, a reception RF section 38, a separating section 39, a demodulation and decoding section 40, a CRC inspection section 41, and an ACK/NACK demodulation section 42.

A radio wave transmitted from a remote station (for example, the reception station shown in FIG. 3) is received by the antenna 37a. The radio-frequency signal of the radio wave received at the antenna 37a is converted into a signal of a comparatively low frequency band such as a baseband signal in the reception RF section 38 and then the signal is input to the separating section 39. The separating section 39 separates the portion corresponding to a feedback signal from the reception signal and extracts and outputs the SINR of each codeword and the response signal of the ACK/NACK signal, etc., contained in the feedback signal. The SINR portion of each codeword is input to the control signal generation section 34 and the ACK/NACK signal portion is input to the ACK/NACK demodulation section 42.

The demodulation and decoding section 40 performs demodulation processing and decoding processing of the reception signal separated in the separating section 39 to restore the received data. The CRC inspection section 41 executes CRC inspection about the data output from the demodulation and decoding section 40 and determines whether or not a data error occurs and the CRC inspection section 41 outputs the data as reception data.

The coding section 31 performs coding processing of transmission data and outputs the data to the rate matching section 32. The rate matching section 32 performs rate matching processing of adaptively setting the number of modulation multiple values and the coding ratio and outputs the result to the MIMO multiplexing section 35. Here, the coding section 31 and the rate matching section 32 perform the coding processing and the rate matching processing based on retransmission control information output from the retransmission signal control section 33.

The retransmission signal control section 33 sets RV parameters concerning retransmission control as the retransmission control information based on the ACK/NACK signal of each codeword output from the ACK/NACK demodulation section 42. The control signal generation section 34 generates a control signal containing transmission parameters indicating the modulation system, the coding ratio, the CQI value, etc., of each codeword of the transmission signal, RV parameters for retransmission control, and the like based on the SINR of each codeword from the separating section 39 and the retransmission control information from the retransmission signal control section 33, and outputs the control signal to the ACK/NACK demodulation section 42 and the MIMO multiplexing section 35.

The ACK/NACK demodulation section 42 inputs the transmission parameters set by the control signal generation section 34 at the transmitting time of data addressed to the reception station, estimates the number of resources based on the transmission parameters corresponding to each codeword about the ACK/NACK signal portion from the separating section 39, and demodulates the ACK/NACK signal.

The MIMO multiplexing section 35 performs multiplex processing of the transmission signal containing the coded transmission data, the control signal containing the transmission parameters and the RV parameters, and the like. It performs interleave processing, modulation processing, etc., separates and generates transmission signals to be output to the antennas, and outputs the transmission signals to the transmission RF sections 36a and 36b.

The transmission RF sections 36a and 36b perform processing of serial/parallel conversion, inverse Fourier transform, etc., of the transmission signals and then convert the signals each into a radio-frequency signal of a predetermined radio frequency band and perform power amplification and then transmits each signal as a radio wave from the antennas 37a and 37b. The transmission signals from the transmission station are transmitted to the reception station as a pilot signal, a control signal, a data signal containing various pieces of data, and the like.

In the configuration described above, the coding section 31, the rate matching section 32, and the MIMO multiplexing section 35 implement the function of a transmission section. The ACK/NACK demodulation section 42, the retransmission signal control section 33, and the control signal generation section 34 implement the function of a retransmission control section. The ACK/NACK demodulation section 42 implements the function of a response signal demodulation section.

Figure 5:
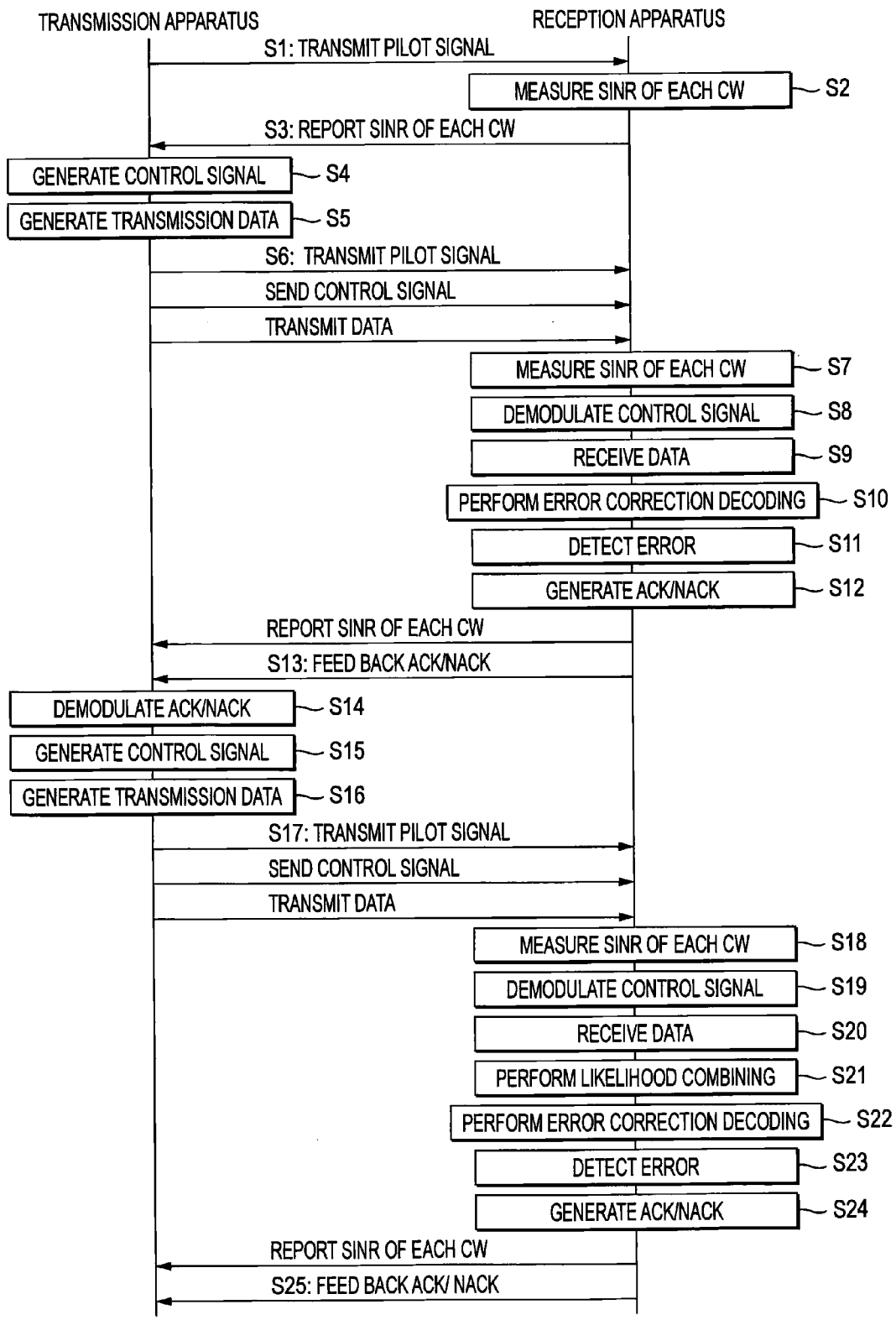
FIG. 5 is a sequence chart to show a specific example of the procedure of general processing concerning communications between the transmission station and the reception station in the embodiment.

Next, a processing procedure for the reception station shown in FIG. 3 and the transmission station shown in FIG. 4 to conduct communications with each other in the embodiment will be described below with reference to FIG. 5: FIG. 5 is a sequence chart to show a specific example of the procedure of general processing concerning communications between the transmission station and the reception station in the embodiment.

At step S1, the transmission station (transmission apparatus) transmits a pilot signal to the reception station (reception apparatus) through a pilot channel. At step S2, the reception station (reception apparatus) receives the pilot signal and observes the reception state of the pilot channel and the SINR measuring section 19 measures and calculates the SINR of each codeword (CW). At this time, the quality rank order of SINRs concerning a plurality of the codewords is held. At step S3, the feedback information generation section 20 generates feedback information containing information of the SINR of each codeword calculated at step S2 and the SINR of each codeword is fed back and reported from the reception station to the transmission station.

In the transmission station, at step S4, the control signal generation section 34 sets the transmission parameters (coding ratio, modulation system, CQI) of each codeword based on the SINR of each fed-back codeword and generates a control signal. In the transmission station, at step S5, the coding section 31, the rate matching section 32, and the MIMO multiplexing section 35 perform processing based on the setup transmission parameters and generate the transmission data of each codeword. At step S6, a pilot signal, the control signal, and the data signal are transmitted from the transmission station to the reception station.

In the reception station, at step S7, the SINR measuring section 19 measures and calculates the SINR of each codeword (CW) from the reception state of the pilot signal as at step S2. At step S8, the control signal demodulation section 14 demodulates the control signal to take out the transmission parameters of the coding ratio, the modulation system, CQI, etc. Subsequently, at step S9, the channel estimation section 13 finds the channel estimation value corresponding to each received codeword and the MIMO demodulation section 15 and the decoding section 16 demodulate and decode the reception data of each codeword using the transmission parameters taken out at step S8, whereby reception processing is performed.

Next, at step S10, the reception station performs processing of error correction decoding for the reception data of each codeword demodulated at step S9 by the decoding section 16. At step S11, the CRC inspection section 18 performs error detection processing of each codeword for the reception signal after the error correction decoding. Then, at step S12, the ACK/NACK generation section 21 generates the corresponding ACK/NACK signal based on the error detection result of each codeword at step S11 and the quality rank order of the codewords. At step S13, the feedback information generation section 20 generates feedback information containing information of the SINR of each codeword calculated at step S7 and the SINR of each codeword and the ACK/NACK signal generated at step S12 are fed back and reported from the reception station to the transmission station.

Here, the ACK/NACK signal generation operation at step S12, the characteristic operation in the embodiment, will be described in detail. The CRC inspection section 18 outputs the error detection result of each codeword to the ACK/NACK generation section 21. At this time, for example, if the reception data can be acquired with no error as the error detection result, 1 is output as ACK; if an error is detected in the reception data, 0 is output as NACK.

The ACK/NACK generation section 21 generates the ACK/NACK signal based on the error detection result of each codeword (value of 1 or 0) received from the CRC inspection section 18 and the transmission parameter (the quality rank order of each codeword according to CQI) received from the control signal demodulation section 14. At the time, less resource is allocated to a lower-order codeword having a lower quality in accordance with the quality rank order of each codeword. The ACK/NACK generation section 21 outputs the generated ACK/NACK signal to the multiplexing section 23. The ACK/NACK signal output order may be made the same as the quality rank order of the codewords or may be the codeword number order.

FIG. 6 is a drawing to show specific examples of resource allocation of
ACK/NACK signal for each codeword responsive to the rank order of the transmission parameters in the first embodiment. In the example shown in FIG. 6(A), when the CQIs of the transmission parameters corresponding to the codewords CW1 to CW4 are CQI3, 8, 19, and 10 in order as in FIG. 2, if the quality rank order is given in the descending order of the transmission parameters, it becomes 4, 3, 1, 2. This means that the larger the CQI value in the transmission parameter, the higher-order codeword having a higher quality. As the transmission parameter, the CQI value itself may be transmitted between terminals or the numeral of the quality rank order may be transmitted. As the resources to be given, eight resources are allocated to the codeword CW3 having the highest rank order, four resources of a half of eight are allocated to the codeword CW4 having the second highest rank order, two resources of a half of four are allocated to the codeword CW2 having the third highest rank order, and one resource of a half of two is allocated to the codeword CW1 having the lowest rank order.

The CQI of the transmission parameter is information assigned by the transmission station based on the SINR fed back by the reception station; it is considered that the SINR value itself is adopted or that the number of information bits that can be transmitted is adopted. As for the number of resources to be allocated, resource distribution in units of the number of symbols, the number of carriers, the number of bits, etc., is possible in such a manner that, for example, for OFDM signal, one subcarrier in 10 FDM symbols is allocated or one chip of CDMA signal is allocated. Further, resource distribution according to the control value of power to be allocated while the number of symbols, the number of carriers is made the same is also possible. Specifically, as shown in FIG. 6(B), a method of setting a power control value smaller than that of CW3 by 3 dB is set in CW4, setting a control value smaller than that of CW3 by 6 dB is set in CW2, and setting a control value smaller than that of CW3 by 9 dB is set in CW1 is also possible. The ACK/NACK signal can be represented not only by the value of 1 or 0, but also by the position of a modulation symbol, etc.

Such an ACK/NACK signal generation method is adopted, whereby if eight resources are allocated to every codeword to ensure the quality conventionally, for example, a total of 32 resources are necessary; in the embodiment, however, the number of resources to be allocated can be reduced to 15. Alternatively, there is an advantage that while the reliability of each codeword having a higher quality is ensured, allocating of fruitless resources to each codeword having a lower quality can be suppressed as compared with the case where a total of 16 resources are used by allocating four resources to each on average.

Referring again to FIG. 5, at step S14, the transmission station demodulates the ACK/NACK signal based on the transmission parameter of the control signal generated at step S4 (or the transmission parameter reported from the reception station). Here, the ACK/NACK signal demodulation operation at step S14, the characteristic operation in the embodiment, will be described supplementary.

The separating section 39 separates the signal portion corresponding to the ACK/NACK signal for every codeword and outputs it to the ACK/NACK demodulation section 42. The control signal generation section 34 sets the transmission parameters of the CQI value, etc., at the transmitting time of data to the reception station and also outputs the transmission parameters to the ACK/NACK demodulation section 42. Using the transmission parameters set at the transmitting time of data addressed to the reception station, the ACK/NACK demodulation section 42 estimates the number of resources based on the transmission parameters corresponding to each codeword about the signal input from the separating section 39 and demodulates the ACK/NACK signal of each codeword.

Next, in the transmission station, at step S15, the control signal generation section 34 sets the transmission parameters (coding ratio, modulation system, CQI) of each codeword as at step S4 based on the SINR of each fed-back codeword and the demodulated ACK/NACK signal and generates a control signal. At step S16, the coding section 31, the rate matching section 32, and the MIMO multiplexing section 35 perform processing based on the setup transmission parameters and generate the transmission data of each codeword. At step S17, a pilot signal, the control signal, and the data signal are transmitted from the transmission station to the reception station.

In the reception station, at step S18, the SINR measuring section 19 measures and calculates the SINR of each codeword (CW) from the reception state of the pilot signal as at step S7. At step S19, the control signal demodulation section 14 demodulates the control signal to take out the transmission parameters of the coding ratio, the modulation system, CQI, etc. Subsequently, at step S20, the channel estimation section 13 finds the channel estimation value corresponding to each received codeword and the MIMO demodulation section 15 and the decoding section 16 demodulate and decode the reception data of each codeword using the transmission parameters taken out at step S19, whereby reception processing is performed. At step S21, the decoding section 16 and the likelihood retention section 17 perform likelihood combining processing for the codeword in which an error is detected at step S11.

Next, at step S22, the reception station performs processing of error correction decoding for the reception data of each codeword demodulated at step S20 by the decoding section 16. At step S23, the CRC inspection section 18 performs error detection processing of each codeword for the reception signal after the error correction decoding. Then, at step S24, the ACK/NACK generation section 21 generates the corresponding ACK/NACK signal based on the error detection result and the quality rank order of each codeword as at step S12. At step S25, the feedback information generation section 20 generates feedback information containing information of the SINR of each codeword calculated at step S18 and the SINR of each codeword and the ACK/NACK signal generated at step S24 are fed back and reported from the reception station to the transmission station.

As described above, in the first embodiment, when the HARQ control using a multiple codeword is performed, in the ACK/NACK signal for each codeword fed back from the reception apparatus to the transmission apparatus, small resources are allocated to the ACK/NACK signal corresponding to a low-order codeword having a lower quality. That is, more resource are allocated to the ACK/NACK signal corresponding to a high-order codeword having a higher quality and the signal is fed back with higher reliability; the effect of the ACK/NACK signal corresponding to a low-order codeword on the throughput is small if the reliability is degraded to some degree and thus the resources to be allocated are reduced for lessening overhead. Accordingly, the overhead of signaling of control information concerning the response signal for playback control can be decreased and it is made possible to enhance the throughput.

(Second Embodiment)

To begin with, resource distribution of RV parameters will be described as resource distribution of signaling concerning retransmission control in a second embodiment of the invention. In the second embodiment, in the RV parameters for each code sent from a transmission apparatus to a reception apparatus, small resources are allocated to the RV parameter corresponding to a low-order codeword having a lower quality.

At this time, the transmission apparatus transmits data with a multiple codeword and also sets the RV parameters in accordance with the quality rank order of codewords as signaling of a control signal in the down direction for sending the RV parameter corresponding to each codeword and reduces the descriptions of the RV parameter corresponding to a low-order codeword having a lower quality. The reception apparatus receives and demodulates the data of each codeword transmitted from the transmission apparatus and when retransmission is performed, the reception apparatus demodulates the RV parameter based on signaling of the control signal in the down direction sent from the transmission apparatus and performs synthesizing processing of the retransmission packet in accordance with the RV parameter.

Figure 7:
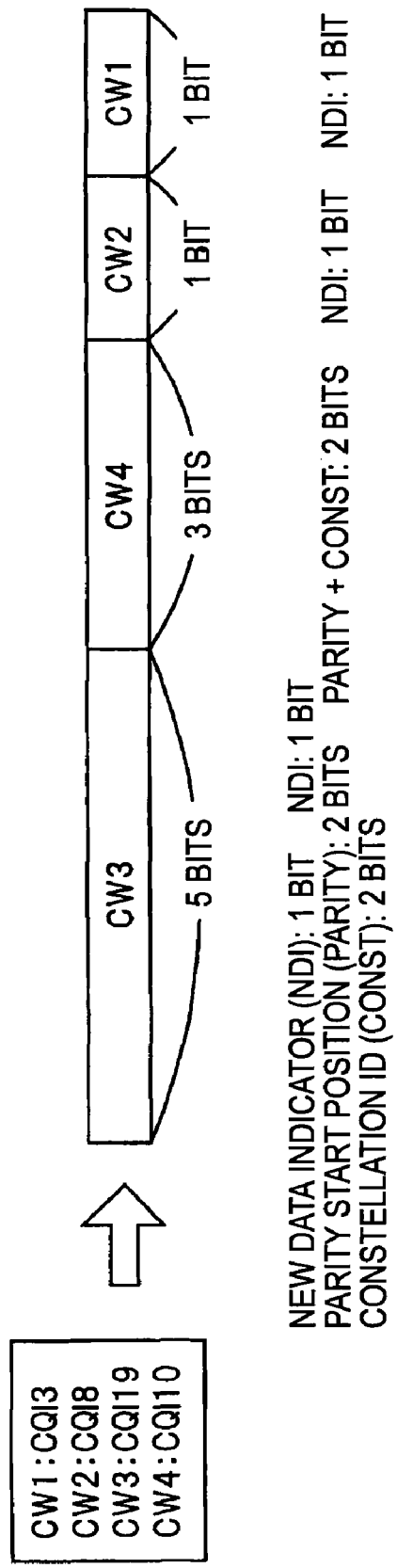
FIG. 7 is a drawing to show an example of the format of RV parameters corresponding to a multiple codeword in a second embodiment of the invention.

FIG. 7 is a drawing to show an example of the format of RV parameters corresponding to a multiple codeword in the second embodiment. Here, the case where data is transmitted through four MIMO channels (transmission paths) and four codewords are used for each transmission path for retransmission control is shown by way of example.

In the example in FIG. 7, CQI of codeword CW1 is 3, CQI of codeword CW2 is 8, CQI of codeword CW3 is 19, and CQI of codeword CW4 is 10.

Therefore, the quality rank order becomes the order of codewords CW3, CW4, CW2, and CW1 from the higher order to the lower order. In this case, a total of five bits of one bit as an indicator indicating whether or not the packet is a new packet (New data indicator: NDI), two bits as an indicator indicating the parity bit start position (Parity), and two bits as an indicator indicating the constellation number (constellation ID) of modulation symbol (Const) are allocated to the RV parameter corresponding to the highest-order codeword CW3. A total of three bits of one bit as NDI and two bits as a combination of Parity and Const are allocated to the RV parameter corresponding to the codeword CW4 next to the codeword CW3. Only one bit of NDI is allocated to each of the RV parameter corresponding to the codeword CW2 next to the codeword CW4 and the RV parameter corresponding to the lowest-order codeword CW1. The placement order of the RV parameters of the codewords is made the same as the quality rank order in FIG. 26, but may be set as required, such as the codeword number order.

Accordingly, the resources for down signaling used for a codeword with a small effect if the flexibility of RV parameters is lowered can be lessened, so that the overhead of signaling in the HARQ control using a multiple codeword can be lessened.

Next, the configurations of specific examples of a reception apparatus and a transmission apparatus of a radio communication system according to the second embodiment will be described.

Figure 8:
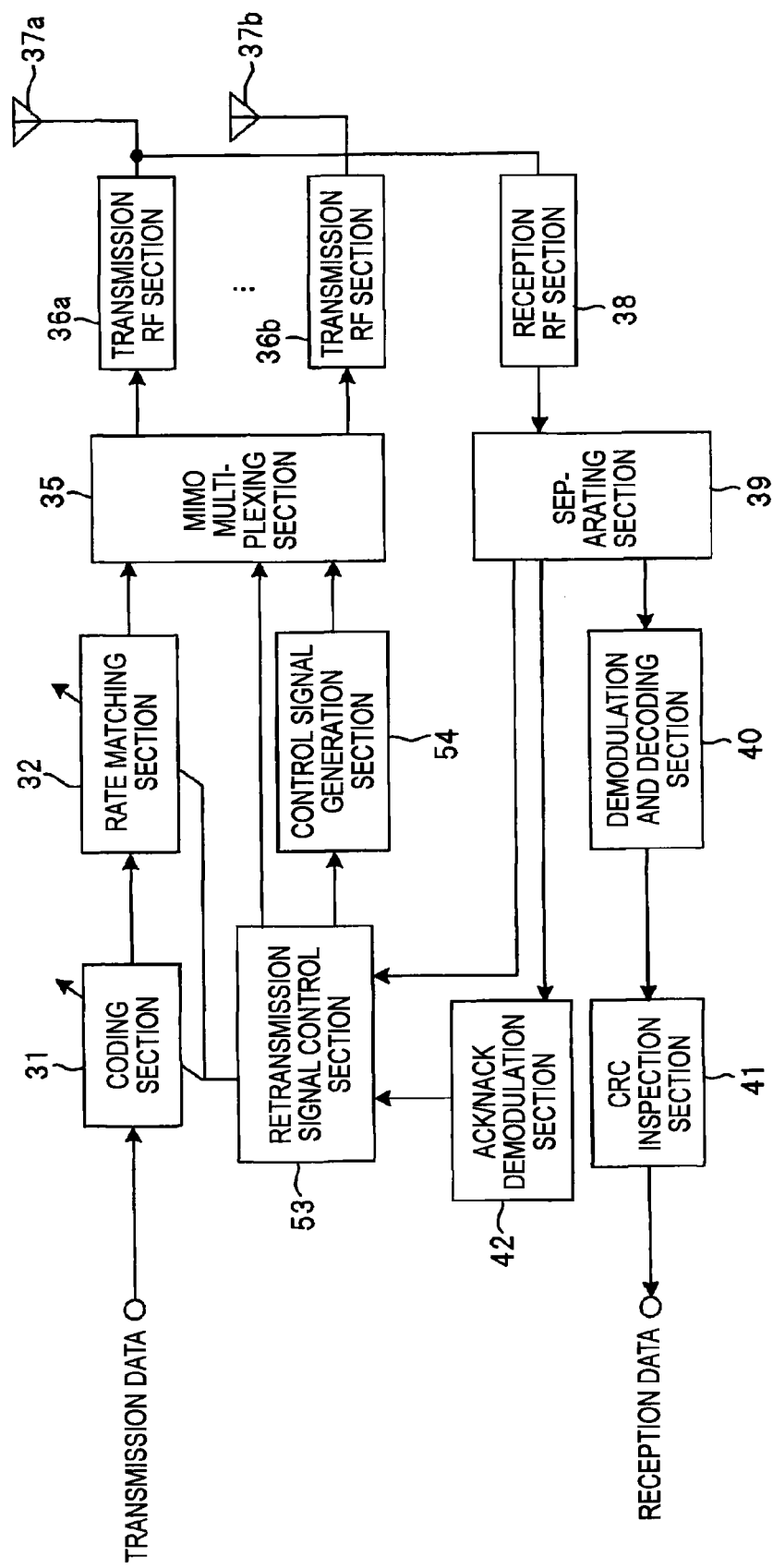
FIG. 8 is a block diagram to show the configuration of the main part of a transmission apparatus (transmission station) used in the second embodiment of the invention.
Figure 9:
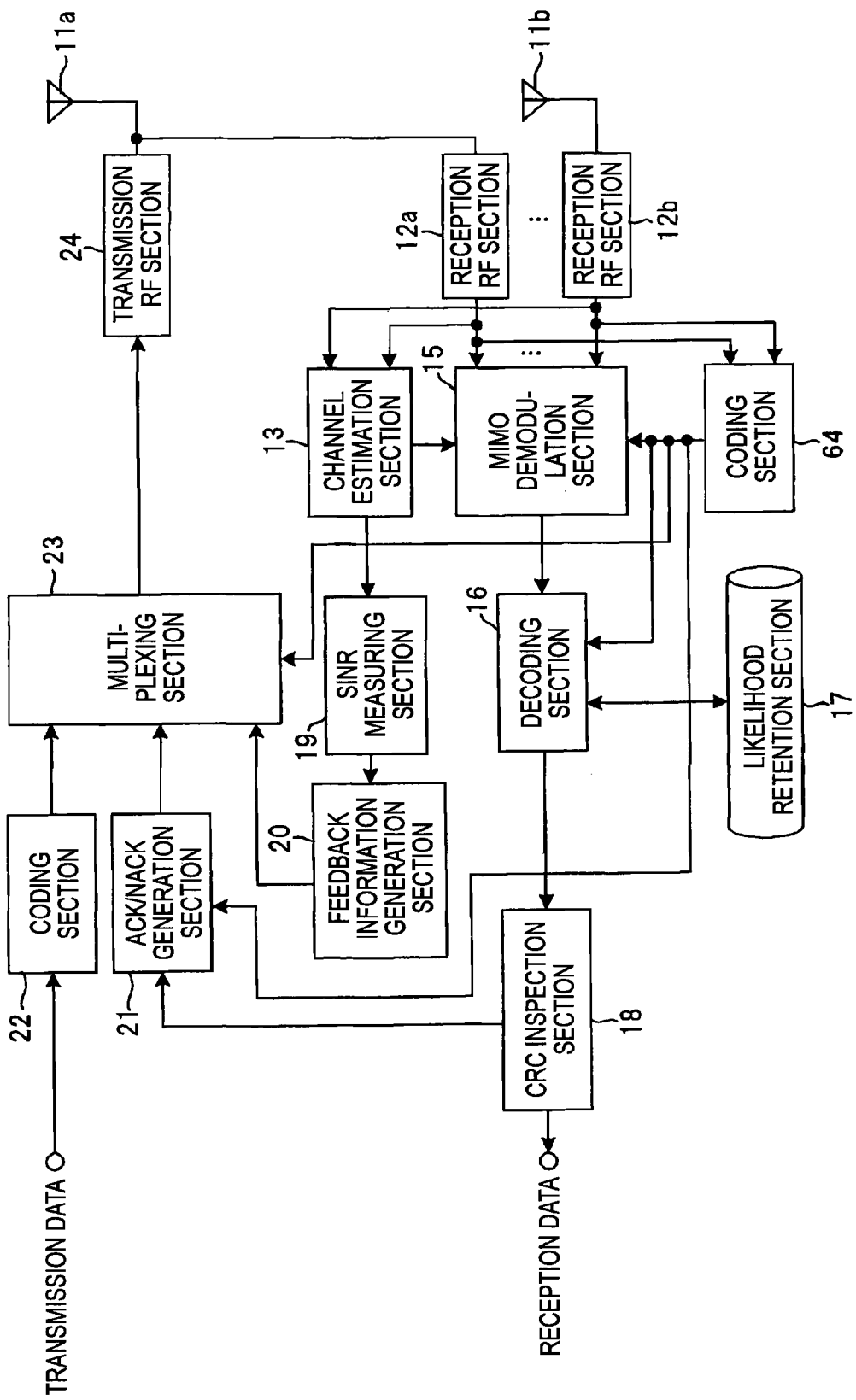
FIG. 9 is a block diagram to show the configuration of the main part of a reception apparatus (reception station) used in the second embodiment of the invention.

FIG. 8 is a block diagram to show the configuration of the main part of a transmission apparatus (transmission station) used in the second embodiment of the invention, and FIG. 9 is a block diagram to show the configuration of the main part of a reception apparatus (reception station) used in the second embodiment of the invention.

The second embodiment is a modified example of a part of the first embodiment. Elements similar to those of the first embodiment are denoted by the same reference numerals in the second embodiment and will not be described again in detail.

The transmission station shown in FIG. 8 differs from that of the configuration in FIG. 4 in operation of a retransmission signal control section 53 and a control signal generation section 54. Here, the RV parameter generation operation, the characteristic operation in the embodiment, will be described in detail.

The retransmission signal control section 53 determines the total number of bits of RV parameters of each codeword (which will be hereinafter referred to as the total number of RV bits) based on the quality rank order assigned in the descending order of the CQI values in the transmission parameters used for the previous data generation and the ACK/NACK signal of each codeword output from an ACK/NACK demodulation section 42. The total number of RV bits contains the three indicators of the indicator indicating whether or not the packet is a new packet (New data indicator: NDI), the indicator indicating the parity bit start position (Parity), and the indicator indicating the constellation number (constellation ID) of modulation symbol (Const).

The retransmission signal control section 53 further sets the transmission parameters (coding ratio, modulation system, CQI) of each codeword based on the SINR of each codeword output from a separating section 39 and also sets RV parameters in response to the total number of RV bits determined by the retransmission signal control section 53.

Here, all indicators of NDI, Parity, and Const of the parameters described above are given to the high-order codeword with the highest rank order of the CQI value (good quality) based on the SINR and the indicators of Parity and Const in the parameters described above are not used for the low-order codeword with the low rank order of the CQI value (poor quality) in accordance with the quality rank order of each codeword.

When generating transmission data of each codeword by a coding section 31, a rate matching section 32, and a MIMO multiplexing section 35, the transmission station performs processing responsive to the RV parameters. Specifically, the retransmission signal control section 53 instructs the coding section 31 to generate new transmission data only when NDI is 1, instructs the rate matching section 32 to perform rate matching processing responsive to the parity bit start position, and instructs the MIMO multiplexing section 35 to perform modulation corresponding to the constellation number of modulation symbol. The retransmission signal control section 53 outputs the setup transmission parameters and RV parameters to the control signal generation section 54.

The control signal generation section 54 generates a control signal according to a predetermined format using the transmission parameters and the RV parameters received from the retransmission signal control section 53 and outputs the control signal to the MIMO multiplexing section 35.

In the configuration described above, the ACK/NACK demodulation section 42, the retransmission signal control section 53, and the control signal generation section 54 implement the function of a retransmission control section. The retransmission signal control section 53 implements the function of a control signal setting section, and the retransmission signal control section 53 or the control signal generation section 54 implements the function of a resource distribution section.

On the other hand, the reception station shown in FIG. 9 differs from that of the configuration in FIG. 3 in operation of a control signal demodulation section 64. The control signal demodulation section 64 takes out a control signal from a reception signal and demodulates the transmission parameters indicating the modulation system, the coding ratio, the CQI value, etc., of the transmission signal of each codeword. Subsequently, the control signal demodulation section 64 demodulates the RV parameters of the corresponding codeword in response to the rank order of the CQI value of the taken-out transmission parameter.

The control signal demodulation section 64 further outputs information of the modulation system corresponding to the transmission parameters and the RV parameters to the MIMO demodulation section 15 and likewise outputs the coding ratio and the parity start position corresponding to the transmission parameters and the RV parameters and instruction information of retransmission synthesis to the decoding section 16.

In the configuration described above, the control signal demodulation section 64 and an ACK/NACK generation section 21 implement the function of a retransmission control section. The control signal demodulation section 64 and the decoding section 16 implement the function of a synthesizing section.

FIG. 10 is a drawing to show specific examples of resource allocation of the RV parameters for each codeword responsive to the rank order of the transmission parameters in the second embodiment. When the CQIs of the transmission parameters corresponding to the codewords CW1 to CW4 are CQI3, 8, 19, and 10 in order as in FIG. 7, if the quality rank order is given in the descending order of the transmission parameters, it becomes 4, 3, 1, 2. This means that the larger the CQI value in the transmission parameter, the higher-order codeword having a higher quality.

As the resources to be given, a total of five bits of NDI (one bit)+Parity (two bits)+Const (two bits) are allocated to the codeword CW3 having the highest rank order. A total of three bits of NDI (one bit)+Parity (one bit)+Const (one bit) are allocated to the codeword CW4 having the second highest rank order. Only one bit of NDI (one bit) is allocated to each of the codeword CW2 having the third highest rank order and the codeword CW1 having the lowest rank order. Such an RV parameter generation method is adopted, whereby if five bits are used for every codeword to ensure the quality conventionally, for example, a total of 20 bits are necessary; in the embodiment, however, the number of bits to be used can be reduced to 10.

The number of bits of the description of each RV parameter is thus set in response to the quality rank order for each codeword, whereby when retransmission control based on HARQ is performed, the control level can be adjusted in such a manner that the high-order codeword is finely controlled and the low-order codeword is roughly controlled. As for the indicator of the description with the number of bits reduced in the RV parameter, the parameter at the retransmission control time may be set as a fixed value or according to a method of determining following a previously defined rule.

As described above, in the second embodiment, when the HARQ control using a multiple codeword is performed, in the RV parameters for each codeword in the control signal reported from the transmission apparatus to the reception apparatus, a small number of bits are allocated to the RV parameters corresponding to a low-order codeword having a lower quality. That is, a large number of bits are allocated to the RV parameters corresponding to a high-order codeword having a higher quality and the retransmission control information with higher flexibility is reported; the effect of the RV parameters corresponding to a low-order codeword on the throughput is small if the flexibility is degraded to some degree and thus the number of bits to be allocated is reduced for lessening overhead. Accordingly, the overhead of signaling of control information concerning the control signal for playback control can be decreased and it is made possible to enhance the throughput.

In the embodiments described above, the number of codewords used between the transmission apparatus and the reception apparatus is four; however, the number of codewords can also be applied in a similar manner, such as two or eight, if it is increased or decreased in response to the number of antennas, the number of beams, etc.

As described above, the radio communication apparatus according to the invention can be installed in a mobile station apparatus (communication terminal) and a base station apparatus in a mobile communication system and accordingly a radio communication mobile station apparatus, a radio communication base station apparatus, and a mobile communication system having the advantages similar to those described above can be provided.

It is to be understood that the invention is not limited to the items shown in the embodiments described above and the invention is also intended for those skilled in the art to make modifications and application based on the Description of the invention and well-known arts and the modifications and the application are contained in the scope to seek protection.

The embodiments have been described by taking the case where the invention is embodied by hardware as an example, but the invention can also be implemented by software.

Each of the function blocks used in the description of the embodiments is implemented typically as an LSI of an integrated circuit. The function blocks may be put individually into one chip or may be put into one chip so as to contain some or all. Here, the integrated circuit is an LSI, but may be called an IC, a system LSI, a super LSI, or an ultra LSI depending on the difference in integration degree.

The technique of putting into an integrated circuit is not limited to an LSI and it may be implemented as a dedicated circuit or a general-purpose processor. An FPGA (Field Programmable Gate Array) that can be programmed after LSI is manufactured or a reconfigurable processor wherein connection and setting of circuit cells in LSI can be reconfigured may be used.

Further, if a technology of putting into an integrated circuit replacing LSI appears with the progress of the semiconductor technology or another deriving technology, the function blocks may be integrated using the technology, of course. There can be a possibility of applying a biotechnology, etc.

While the invention has been described in detail with reference to the specific embodiments, it will be obvious to those skilled in the art that various changes and modifications can be made without departing from the spirit and the scope of the invention.

This application is based on Japanese Patent Application (No. 2007-159406) filed on Jun. 15, 2007, which is incorporated herein by reference.

Industrial Applicability

The invention has the advantage that it can decrease the overhead of signaling for retransmission control using a multiple codeword and makes it possible to enhance throughput, and is useful as a radio communication apparatus, a radio communication system, a radio communication method, etc., that can be applied to MIMO (Multiple-Input Multiple-Output), etc., for conducting communications using multiple antennas.

The invention claimed is:

1. A radio communication apparatus for performing data transmission using a multiple codeword, the radio communication apparatus comprising:
a retransmission control section that performs retransmission control of data transmitted with the multiple codeword; and
a resource distribution section that distributes resources of control information concerning the retransmission control based on the quality rank order of respective codewords in the multiple codeword,
wherein the resource distribution section allocates less resource to a codeword having a lower quality.

2. A radio communication apparatus which receives data transmitted from the radio communication apparatus according to claim 1, comprising:
a demodulation section that demodulates the data transmitted with the multiple codeword; and
a response signal generation section that generates a response signal corresponding to a demodulation result of demodulated data of the respective codewords as the control information concerning the retransmission control,
wherein the resource distribution section allocates less resource to the response signal for a codeword having a lower quality.

3. The radio communication apparatus according to claim 1, comprising:
a transmission section that transmits data with the multiple codeword; and
a control signal setting section that sets a control signal containing retransmission control parameters corresponding to the respective transmitted codewords as the control information concerning the retransmission control,
wherein the resource distribution section allocates less resource to the control signal for a codeword having a lower quality.

4. A radio communication apparatus for performing data transmission using a multiple codeword, the radio communication apparatus comprising:
a demodulation section that demodulates the data transmitted with the multiple codeword; and
a response signal generation section that generates a response signal corresponding to a demodulation result of the demodulated data of respective codewords,
wherein the response signal generation section allocates less resource to a codeword having a lower quality.

5. The radio communication apparatus according to claim 4, wherein the response signal generation section generates an ACK/NACK signal as the response signal, and allocates resources to the respective codewords, the resources containing at least one of the number of symbols, the number of subcarriers, the number of bits, and a power control value; and
wherein the ACK/NACK signal indicates whether data for the respective code words can be normally demodulated or not.

6. The radio communication apparatus according to claim 5, wherein the response signal generation section generates the response signal so as to allocate more resource to a high-order codeword having a higher quality and allocate less resource to a codeword having a lower quality.

7. A radio communication apparatus for performing data transmission using a multiple codeword, the radio communication apparatus comprising:
a transmission section that transmits data with the multiple codeword; and
a response signal demodulation section that demodulates a response signal of the transmitted data, the response signal fed back from a remote station,
wherein the response signal demodulation section demodulates the response signal based on the quality rank order of the transmitted codewords and resource amounts allocated to the codewords.

8. A radio communication apparatus for performing data transmission using a multiple codeword, the radio communication apparatus comprising:
a transmission section that transmits data with the multiple codeword; and
a control signal setting section that sets a control signal containing retransmission control parameters corresponding to respective codewords to be transmitted,
wherein the control signal setting section sets the control signal so as to allocate less resource to the control signal for a codeword having a lower quality.

9. The radio communication apparatus according to claim 8, wherein the control signal setting section sets a control signal containing RV(redundancy version) parameters as the retransmission control parameters and allocates resources to the respective codewords, each of the resources containing at least one of a content and the number of bits of an RV parameter.

10. The radio communication apparatus according to claim 9, wherein the control signal setting section sets the control signal in accordance with the quality rank order so as to allocate more resource to the RV parameter corresponding to a high-order codeword having a higher quality and reduces at least one of the content and the number of bits of the RV parameter corresponding to a codeword having a lower quality more than others.

11. A radio communication apparatus for performing data transmission using a multiple codeword, the radio communication apparatus comprising:
   a demodulation section that demodulates the data transmitted with the multiple codeword; and
   a synthesizing section that synthesizes a retransmission packet when the data is retransmitted,
   wherein the synthesizing section synthesizes the retransmission packet based on a content of the control signal set according to the quality rank order of respective codewords and transmitted from a remote station.

12. A radio communication base station apparatus equipped with the radio communication apparatus according to claim 1.

13. A radio communication mobile station apparatus equipped with the radio communication apparatus according to claim 4.

14. A radio communication system for performing data transmission using a multiple codeword, the radio communication system comprising:
   a reception apparatus including:
      a demodulation section that demodulates data transmitted from a transmission apparatus with the multiple codeword; and
      a response signal generation section that, when generating a response signal corresponding to a demodulation result of the demodulated data of respective codewords, generates the response signal so as to allocate less resource to a codeword having a lower quality, and
   the transmission apparatus including:
      a transmission section that transmit the data to the reception apparatus with the multiple codeword; and
      a response signal demodulation section that, when demodulating the response signal of the transmitted data, the response signal fed back from the reception apparatus, demodulates the response signal based on the quality rank order of the transmitted codewords and resource amounts allocated to the respective codewords.

15. A radio communication system for performing data transmission using a multiple codeword, the radio communication system comprising:
   a transmission apparatus including:
      a transmission section that transmits data to a reception apparatus with the multiple codeword; and
      a control signal setting section that, when setting a control signal containing retransmission control parameters corresponding to the transmitted respective codewords, set the control signal so as to allocate less resource to the control signal for a codeword having a lower quality, and
   the reception apparatus including:
      a demodulation section that demodulates the data transmitted from the transmission apparatus with the multiple codeword; and
      a synthesizing section that, when synthesizing a retransmission packet when the data is retransmitted, synthesizes the retransmission packet based on a content of the control signal set according to the quality rank order of the respective codewords and transmitted from the transmission apparatus.

16. A radio communication method for performing data transmission using a multiple codeword, the radio communication method comprising:
   in a reception apparatus,
   a demodulation step of demodulating data transmitted from a transmission apparatus with the multiple codeword; and
   a response signal generation step, when generating a response signal corresponding to a demodulation result of the demodulated data of respective codewords, the step of generating the response signal so as to allocate less resource to a codeword having a lower quality, and
   in the transmission apparatus,
   a transmission step of transmitting the data to the reception apparatus with the multiple codeword; and
   a response signal demodulation step, when demodulating the response signal of the transmitted data, the response signal fed back from the reception apparatus, the step of demodulating the response signal based on the quality rank order of the transmitted codewords and resource amounts allocated to the respective codewords.

17. A radio communication method for performing data transmission using a multiple codeword, the radio communication method comprising:
   in a transmission apparatus,
   a transmission step of transmitting data to a reception apparatus with the multiple codeword; and
   a control signal setting step, when setting a control signal containing retransmission control parameters corresponding to the transmitted respective codewords, the step of setting the control signal so as to allocate less resource to the control signal for a codeword having a lower quality rank order, and
   in a reception apparatus,
   a demodulation step of demodulating the data transmitted from the transmission apparatus with the multiple codeword; and
   a synthesizing step, when synthesizing a retransmission packet when the data is retransmitted, the step of synthesizing the retransmission packet based on a content of the control signal set according to the quality rank order of the respective codewords and transmitted from the transmission apparatus.

* * * * *